United States Patent Office 2,797,214
Patented June 25, 1957

2,797,214
TETRAKISAZO DYESTUFFS

Werner Bossard, Riehen, near Basel, Switzerland, assignor to J. R. Geigy A. G., Basel, Switzerland, a Swiss firm No Drawing. Application February 15, 1954, Serial No. 410,410

Claims priority, application Switzerland March 6, 1953

7 Claims. (Cl. 260—153)

The present invention concerns a process for the production of metallisable tetrakisazo dyestuffs, the coppered cellulose dyeings of which have very good fastness properties.

It has been found that valuable metallisable tetrakisazo dyestuffs are obtained if 2 mols of the same or different diazonium compounds of amino monoazo dyestuffs of the general formula:

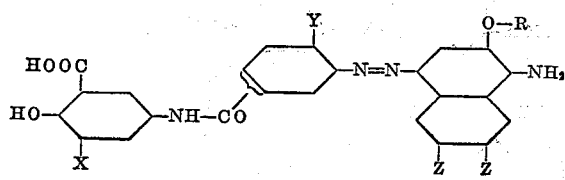

wherein

X represents hydrogen, halogen, the methyl or the sulphonic acid group,

Y represents hydrogen, halogen, the methyl or the methoxy group, one Z represents hydrogen, the other Z represents hydrogen or the sulphonic acid group, and R represents an unsubstituted or substituted alkyl radical with 1 to 2 carbon atoms, in particular the methyl, ethyl or carboxymethyl radical, are coupled with 1 mol of a compound of the general formula:

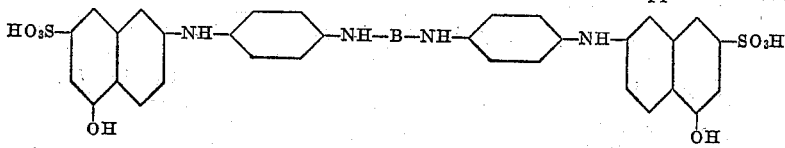

wherein B represents a bridging member which links the nitrogen atoms of the phenyl amino groups with the aid of acid functional groups of carbon.

Particularly favourable amino monoazo dyestuffs usable according to the present invention correspond to the general formula:

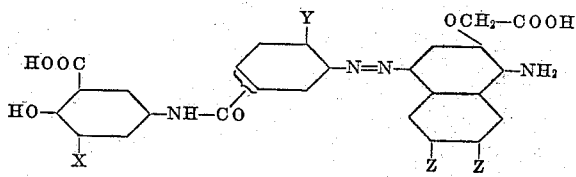

wherein Y, X and Z have the meanings given above.

B, the bridging member of the coupling component which links the nitrogen atoms of the phenylamino groups with the aid of acid functional groups of carbon, can be derived from polybasic acids of simple and more complicated structure. It can be, for example, the radical of carbonic acid, of thiocarbonic acid, the radical of carbonic acid derivatives linked to heterocyclic rings in particular the radical of cyanuric acid, the radical of aliphatic or aromatic dicarboxylic acids such as, e. g. oxalic acid, succinic acid, pimelic acid, adipic acid, sebacic acid, fumaric acid, dimethyl ether dicarboxylic acid, thiodiglycolic acid, iso- or terephthalic acid. It can also be with advantage the dicarbonic acid half ester radical of aliphatic diols, e. g. that of ethylene glycol, of 1.2- or 1.3-dihydroxypropane, of 1.4- or 2.3-dihydroxybutane, of β.β'-dihydroxydiethyl ether, of β.β'-dihydroxydiethyl sulphide, of ω.ω'-dihydroxy-triethylene diether.

Coupling components usable according to the present invention are obtained by reacting 2-(4'-aminophenylamino)-5-hydroxynaphthalene-7-sulphonic acid, advantageously in the form of the aqueous solution of its alkali metal salts, with the acid halides corresponding to the bridging member B until the primary amino group disappears, i. e. for example with phosgene, thiophosgene, cyanuric acid chloride—in which reaction it is of advantage to replace the third halogen atom thereof by ammonia, primary or secondary amines—with dicarboxylic acid chlorides or bromides of the dicarboxylic acids mentioned above or with the dichlorocarbonic acid esters of the diols listed above.

The amino monoazo dyestuffs usable according to this invention are diazotised according to the usual methods in a mineral acid aqueous solution or suspension with sodium nitrite and the coupling with the derivatives of 2-(4'-aminophenylamino) - 5 - hydroxynaphthalene - 7-sulphonic acid is performed in an alkaline medium, advantageously in the presence of tertiary nitrogen bases such as pyridine bases or ethanolamines which accelerate the coupling.

In the form of their alkali metal salts, the metallisable tetrakisazo dyestuffs according to the present invention are dark powders which dissolve in water with a more or less pure blue colour according to the composition, and they dissolve in concentrated sulphuric acid with a blue-black to black-green colour. They dye cellulose fibres from a bath containing Glaubers salts in blue to green-blue shades which are fixed fast to wet and light by coppering.

The dyestuffs according to the present invention can be coppered in substance, but it is more advantageous to copper on the fibre. The direct cellulose dyeings can be coppered in the dyebath or in a fresh bath in a neutral to weakly acid medium with the usual copper salts, such as for example, copper acetate or copper sulphate. If desired copper compounds which are stable to alkalies can be used such as those obtained on the reaction of copper sulphate with sodium tartrate in a soda alkaline bath. The coppering can also be performed at the same time as the dyeings are treated with agents to improve the wet fastness and fastness to creasing, e. g. together with dimethylol urea or with trimethylol melamine. Also resins containing copper can be used such as are obtained by treating formaldehyde condensation products of biguanide compounds with copper salts.

The following examples illustrate the invention without limiting it in any way. Parts are given as parts by weight and the temperatures are in degrees centigrade.

Example 1

28.6 parts of 5-(3'-methyl-4'-aminobenzoylamino)-2-hydroxybenzene-1-carboxylic acid and 4 parts of sodium hydroxide are dissolved in 400 parts of water, mixed with 6.9 parts of sodium nitrite and the whole is poured at 20° on to 40 parts of concentrated hydrochloric acid. The yellow-brown suspension of the diazonium compound which has been neutralised with 4.5 parts of sodium carbonate is coupled with 29.7 parts of 1-amino-2-naphthyl glycolic acid-6-sulphonic acid in the presence of 20 parts of sodium acetate. The reaction is kept weakly acetic acid by the dropwise addition of 5.3 parts of sodium carbonate in 50 parts of water. After some time, 500 parts of sodium chloride and 100 parts of concentrated hydrochloric acid are added and then 9 parts of sodium nitrite in 27 parts of water are slowly poured at 30° into the solution. As soon as the diazotisation is complete, the diazonium compound is filtered off, the dark brown filter cake obtained is pasted in 400 parts of water and coupled with 37.4 parts of the condensation product from 1 mol of cyanuric acid chloride with 2 mols of 2-(4'-aminophenylamino)-5-hydroxynaphthalene-7-sulphonic acid and 1 mol of aniline in 300 parts of water, 300 parts of pyridine and 40 parts of sodium carbonate. The next day, the pure blue tetrakisazo dyestuff of the formula

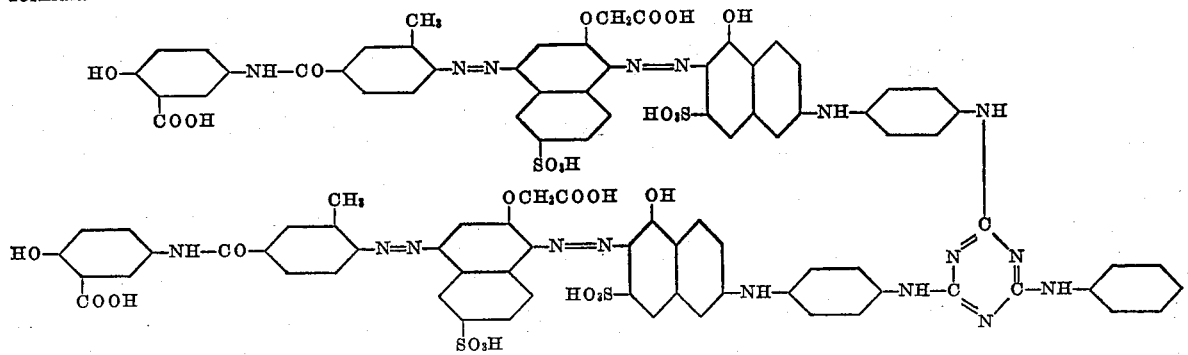

is precipitated with a little sodium chloride, filtered off, washed free of impurities and dried. It is a dark powder which dissolves in water with a pure blue colour and in concentrated sulphuric acid with a black-green colour. Natural or regenerated cellulose fibres are dyed in pure blue shades which, on treating with copper salts, only slightly change their shade and have excellent fastness to washing, acid and light.

If in this example, the 37.4 parts of the condensation product from 1 mol of cyanuric acid chloride with 2 mols of 2-(4'-aminophenylamino)-5-hydroxynaphthalene-7-sulphonic acid and 1 mol of aniline are replaced by 38.0 parts of the condensation product from 1 mol of cyanuric acid chloride with 2 mols of 2-(4'-aminophenylamino)-5-hydroxynapthalene-7-sulphonic acid and 1 mol of p-toluidine, 34.9 parts of the condensation product from 1 mol of cyanuric acid chloride with 2 mols of 2-(4'-aminophenylamino)-5-hydroxynaphthalene-7-sulphonic acid and 1 mol of ammonia, 34.5 parts of the condensation product from 1 mol of cyanuric acid chloride with 2 mols of 2-(4'-aminophenylamino)-5-hydroxynaphthalene-7-sulphonic acid and 1 mol of methylamine, 36.4 parts of the condnesation product from 1 mol of cyanuric acid chloride with 2 mols of 2-(4'-aminophenylamino)-5-hydroxynaphthalene-7-sulphonic acid and 1 mol of diethylamine, 40.0 parts of the condensation product from 1 mol of cyanuric acid chloride with 2 mols of 2-(4'-aminophenylamino)-5-hydroxynaphthalene-7-sulphonic acid and 1 mol of 5-amino-2-hydroxybenzene-1-carboxylic acid or by 35.6 parts of the condensation product from 1 mol of benzene-1.4- or 1.3-dicarboxylic acid chloride with 2 mols of 2-(4'-aminophenylamino)-5-hydroxynaphthalene-7-sulphonic acid, then similar dyestuffs with similar properties are obtained.

Example 2

27.2 parts of 5-(4'-aminobenzoylamino)-2-hydroxybenzene-1-carboxylic acid are diazotised in the usual way and coupled in a weakly acid solution with 21.7 parts of 1-amino-2-naphthyl glycolic acid in 600 parts of water. The monoazo dyestuff suspension formed is mixed with 500 parts of sodium chloride and 100 parts of concentrated hydrochloric acid and a solution of 9 parts of sodium nitrite in 27 parts of water is slowly added at 30°. On completion of the diazotisation, the brown diazonium monoazo compound is filtered off, washed with water and pasted in 400 parts of water. 30.0 parts of the sodium salt of 2-(4'-aminophenylamino)-5-hydroxynaphthalene-7-sulphonic acid are dissolved at 80° in 180 parts of water and the solution is cooled to 40° by the addition of ice. 2.5 parts of sodium acetate are added and 9 parts of ethylene glycol dichlorocarbonic acid ester and 4.9 parts of sodium carbonate in 24 parts of water are so added dropwise simultaneously that the reaction always remains weakly acid to blue litmus paper. After a short time the condensation is complete. 250 parts of pyridine and 40 parts of sodium carbonate are added and the paste of the diazo monoazo dyestuff is added thereto. The next morning the tetrakisazo dyestuff of the formula

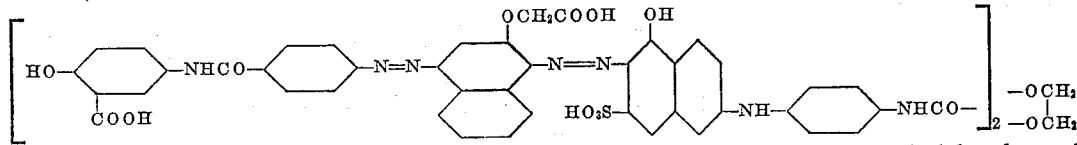

has precipitated. It is filtered off, washed free from adhering yellow and red impurities and dried. The dark powder so obtained dissolves in water with a pure blue and in concentrated sulphuric acid with a blue-black colour. Cellulose dyeings after coppered in the usual way are a pure greenish blue shade and have excellent fastness to washing, tartaric acid and light.

If instead of the 9.0 parts of ethylene glycol di-chlorocarbonic acid ester, 11.1 parts of diethylene glycol di-chlorocarbonic acid ester, 13.2 parts of triethylene glycol di-chlorocarbonic acid ester, 9.7 parts of 1.3-dihydroxypropane-di-chlorocarbonic acid ester, 10.4 parts of 1.2- or 1.4-n-dihydroxybutane-di-chlorocarbonic acid ester or the corresponding number of parts of the aliphatic dicarboxylic acid chlorides named in Example 4 are used and otherwise the same procedure as described in this example is followed, similar dyestuffs with similar properties are obtained.

Example 3

27.2 parts of 5-(3'-aminobenzoylamino)-2-hydroxybenzene-1-carboxylic acid are diazotised in the usual way with 6.9 parts of sodium nitrite and the diazonium compound obtained is coupled with 21.7 parts of 1-amino-2-naphthyl glycolic acid in the presence of 20 parts of sodium acetate. To accelerate the coupling, 6 parts of sodium carbonate are added dropwise until there is a neutral reaction. The violet-blue suspension of the monoazo dyestuff is mixed with 500 parts of sodium chloride and 100 parts of concentrated hydrochloric acid and diazotised by the slow dropwise addition of 9 parts of sodium nitrite in 27 parts of water at 30–35°. The diazonium compound, after filtering off and washing, is pasted in 400 parts of water and coupled in the presence of 300 parts of pyridine and 40 parts of sodium carbonate with the condensation product obtained by reacting 30 parts of 2-(4'-aminophenylamino)-5-hydroxynaphthalene-7-sulphonic acid in a neutral aqueous solution with phosgene. The tetrakisazo dyestuff of the formula:

dissolved in 600 parts of water and finally 5.2 parts of sodium carbonate in 50 parts of water are added. After some time, 500 parts of sodium chloride and 100 parts of concentrated hydrochloric acid are poured in and the whole is diazotised at 30° with 9 parts of sodium nitrite. As soon as no more aminomonoazo dyestuff can be traced, the diazonium compound is filtered off, washed with water and pasted in 400 parts of ice water. It is coupled with a solution of the condensation product from 30 parts of 2-(4'-aminophenylamino)-5-hydroxynaphthalene-7-sulphonic acid and 11.5 parts of sebacic acid dichloride in 300 parts of water, 300 parts of pyridine and 40 parts of soda. The next day, the precipitated

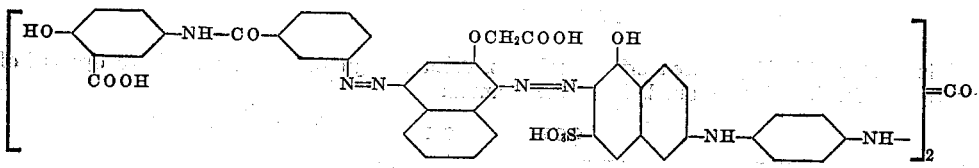

is filtered off the next day, washed free of by-products and dried. It is a dark powder which dissolves in water dyestuff is filtered off, washed, dried and ground. The tetrakisazo dyestuff so obtained of the formula

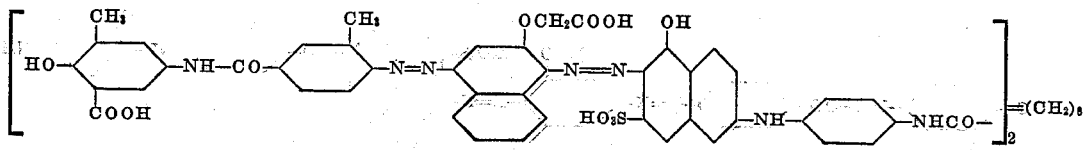

with a pure blue and in concentrated sulphuric acid with a black colour. Natural or regenerated cellulose dyeings when after-coppered have pure blue shades and are fast to washing, acid and light.

If instead of the 27.2 parts of 5-(3'-aminobenzoylamino)-2-hydroxybenzene-1-carboxylic acid, 28.6 parts of 5-(4'-methyl-3'-aminobenzoylamino)-2-hydroxybenzene-1-carboxylic acid, 30.2 parts of 5-(4'-methoxy-3'-aminobenzoylamino)-2-hydroxybenzene-1-carboxylic acid, 30.65 parts of 5-(4'-chloro-3'-aminobenzoylamino)-2-hydroxybenzene-1-carboxylic acid, 28.6 parts of 5-(3'-aminobenzoylamino)-2-hydroxy-3- or -4-methylbenzene-1-carboxylic acid, 30.65 parts of 5-(3'-aminobenzoylamino)-2-hydroxy-3-chlorobenzene-1-carboxylic acid, 30.0 parts of 5-(4'-methyl-3'-aminobenzoylamino)-2-hydroxy-3-methylbenzene-1-carboxylic acid, 35.2 parts of 5-(3'-aminobenzoylamino)-2-hydroxybenzene-3-sulphonic acid-1-carboxylic acid or 36.6 parts of 5-(4'-methyl-3'-aminobenzoylamino)-2-hydroxybenzene-3-sulphonic acid-1-carboxylic acid are used as starting component, then similar pure blue dyestuffs with similar properties are obtained.

If in the production of the above dyestuffs instead of the condensation product from 2-(4'-aminophenylamino)-5-hydroxynaphthalene-7-sulphonic acid and phosgene such a product using thiophosgene is used, then dyestuffs with similar properties are also obtained.

Example 4

30.0 parts of 5-(3'-methyl-4'-aminobenzoylamino)-2-hydroxy-3-methylbenzene-1-carboxylic acid are dissolved in 400 parts of water and 4 parts of caustic soda lye, 6.9 parts of sodium nitrite are added and the whole is stirred at 20° in 40 parts of concentrated hydrochloric acid. The orange-brown suspension of the diazonium compound is neutralised with 4.8 parts of sodium carbonate. 20 parts of sodium acetate in 60 parts of water and then 21.7 parts of 1-amino-2-naphthyl-glycolic acid is a dark powder and dyes cellulose fibres when after coppered in pure greenish blue shades which have excellent fastness properties. It dissolves in water with a pure blue and in concentrated sulphuric acid with a blue-black colour.

If instead of the condensation product from 30 parts of 2-(4'-aminophenylamino)-5-hydroxynaphthalene-7-sulphonic acid and 11.5 parts of sebacic acid dichloride, a condensation product from 30 parts of 2-(4'-aminophenylamino)-5-hydroxynaphthalene-7-sulphonic acid and 6.1 parts of oxalic chloride, 7.5 parts of succinic acid dichloride, 8.8 parts of adipic acid dichloride, 8.2 parts of diglycolic acid dichloride, 9.0 parts of thiodiglycolic acid dichloride or 7.4 parts of fumaric acid dichloride or one of the condensation products named in Example 2 is used, then similar dyestuffs with similarly good properties are obtained.

Example 5

28.6 parts of 5-(4'-aminobenzoylamino)-3-methyl-2-hydroxybenzene-1-carboxylic acid are diazotised in the usual way with 6.9 parts of sodium nitrite and coupled in a weakly acetic acid solution with 29.7 parts of 1-amino-2-naphthylglycolic acid-7-sulphonic acid. To diazotise the monoazo dyestuff obtained, 500 parts of sodium chloride, 100 parts of concentrated hydrochloric acid and 9 parts of sodium nitrite, the latter slowly at 25–30°, are added. The completely formed diazonium compound is filtered off, washed with water and pasted in 400 parts of water. It is then poured into a solution of the condensation product from 60 parts of 2-(4'-aminophenylamino)-5-hydroxynaphthalene-7-sulphonic acid and phosgene in 600 parts of water, 400 parts of pyridine and 40 parts of sodium carbonate. A deep blue solution is formed immediately. 24 parts of ammonia and the paste of a diazomonoazo compound obtained according to Example 2 from 27.2 parts of 5-(4'-aminobenzoylamino)-2-hydroxybenzene-1-carboxylic acid and 21.7 parts of 1-amino-2-naphthylglycolic acid are added. The next day, the tetrakisazo dyestuff, which has the probable composition:

day the tetrakisazo dyestuff is salted out with sodium chloride, filtered off, washed with diluted sodium chloride

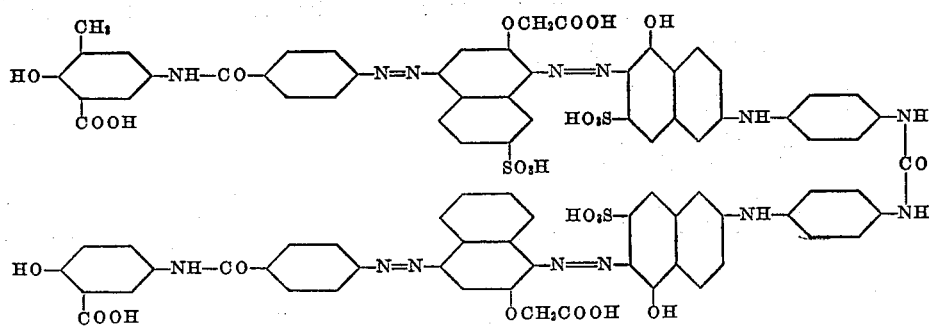

is precipitated with a little sodium chloride, filtered off, washed free of impurities and dried. When ground, it solution, dried and ground. The tetrakisazo dyestuff of the formula:

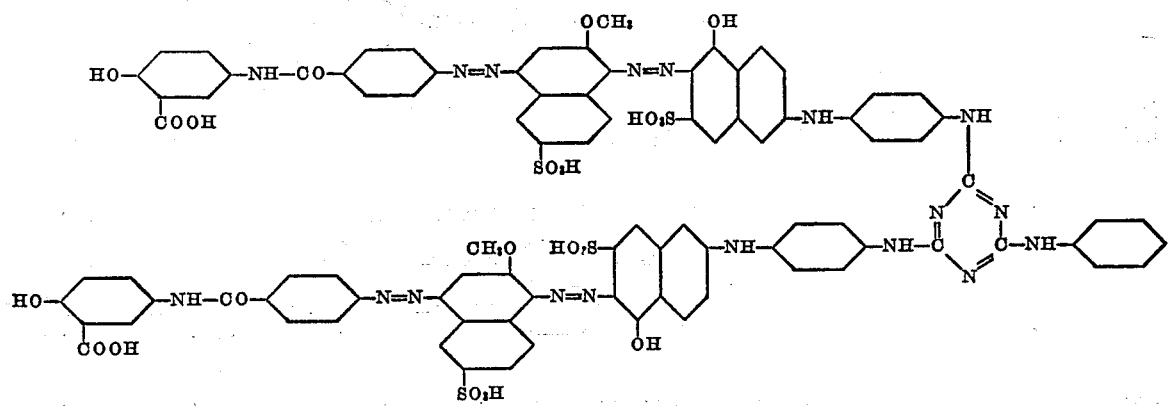

is a dark powder which dissolves in water with a pure blue and in concentrated sulphuric acid with a black colour. It dyes cellulose dyeings when after coppered in fast green-blue shades.

If 27.2 parts of 5-(4'-aminobenzoylamino)-2-hydroxybenzene-1-carboxylic acid or 35.2 parts of 5-(4'-aminobenzoylamino)-2-hydroxybenzene-1-carboxylic acid-3-sulphonic acid are used instead of 28.6 parts of 5-(4'-aminobenzoylamino)-3-methyl-2-hydroxybenzene-1-carboxylic acid or if instead of the diazomonoazo dyestuff from Example 2, equivalent parts of the diazomonoazo dyestuff from Example 1, 3 or 4 are used to form the tetrakisazo dyestuff and otherwise the same procedure as described in this example is followed, similar dyestuffs with similarly good properties are obtained.

*Example 6*

27.6 parts of 5-(4'-aminobenzoylamino)-2-hydroxybenzene-1-carboxylic acid are diazotised in the known manner and coupled with 25.3 parts of 1-amino-2-methoxynaphthalenes-6-sulphonic acid in the presence of 20 parts of sodium acetate. The monoazo dyestuff suspension obtained is mixed with 25 volume percent of sodium chloride and 100 parts of concentrated hydrochloric acid and diazotised at 25–30° with 9 parts of sodium nitrite. After stirring overnight, the diazomonoazo dyestuff is filtered off, washed with water and pasted in 400 parts of water. It is coupled with 40.0 parts of the condensation product from one mol of cyanuric acid chloride, 2 mols of 2-(4'-aminophenylamino)-5-hydroxynaphthalene-7-sulphonic acid and one mol of aniline in 300 parts of water, 300 parts of pyridine and 20 parts of sodium bicarbonate. The next dissolves in water with a pure blue and in concentrated sulphuric acid with a green-black colour. The aftercoppered dyeings on cellulose fibers are distinguished by their pure blue shade and by good fastness to wet.

If in this example, instead of the 25.3 parts of 1-amino-2-methoxynaphthalene-6-sulphonic acid, the same amounts of 1-amino-2-methoxynaphthalene-7-sulphonic acid or 26.7 parts of 1-amino-2-ethoxynaphthalene-6- or -7-sulphonic acid are used to form the tetrakisazo dyestuff, then similar blue dyestuffs are obtained.

*Example 7*

1.0 part of the dyestuff obtained according to Example 2 and 2 parts of soda are dissolved in a dyebath containing 3000 parts of water. 100 parts of cotton are entered at 40–50°, the bath is heated to 90–95° within 30 minutes, 30 parts of sodium sulphate are added and dyeing is continued for 45 minutes at this temperature. After this time, the dyebath is completely exhausted. The dyed goods are rinsed cold and after-treated at 70° in a fresh bath containing 2 parts of crystallised copper sulphate in 2000 parts of water and 2 parts of 30% acetic acid. The goods are rinsed and dried in the usual way. The cotton is dyed in pure greenish-blue shades which have good washing, water, perspiration and light fastness properties.

What I claim is:
1. A tetrakisazo dyestuff having the general formula:

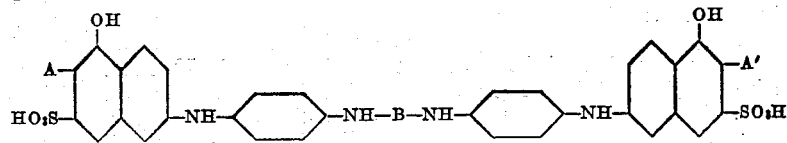

wherein B is a bivalent radical selected from the group consisting of carbonyl, biscarbonyl-alkylene, biscarbonyl-phenylene, bis-(carbonyloxy)-alkylene and 1,3,5-triazinyl radicals, A and A' represent radicals of the formula:

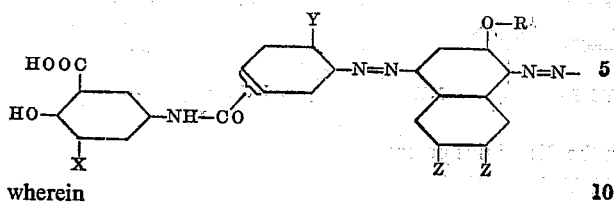

wherein

X represents a member selected from the group consisting of hydrogen, chlorine, the methyl and the sulphonic acid group,
Y represents a member selected from the group consisting of hydrogen, chlorine, the methyl and the methoxy group,
one Z represents hydrogen and
the other Z represents a member selected from the group consisting of hydrogen and the sulphonic acid group,
R represents a member selected from the group consisting of methyl, ethyl and carboxymethyl radicals.

2. A tetrakisazo dyestuff having the general formula:

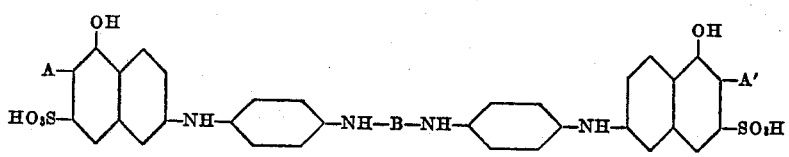

wherein B is a bivalent radical selected from the group consisting of carbonyl, biscarbonyl-alkylene, biscarbonyl-phenylene, bis-(carbonyloxy)-alkylene and 1,3,5-triazinyl radicals, A and A' represent radicals of the formula:

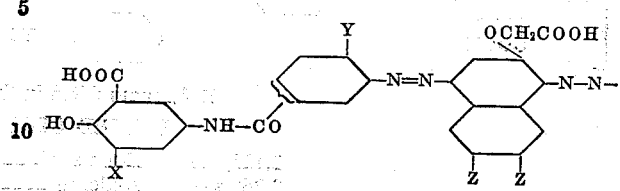

wherein

X represents a member selected from the group consisting of hydrogen, chlorine, the methyl and the sulphonic acid group,
Y represents a member selected from the group consisting of hydrogen, chlorine, the methyl and the methoxy group,
one Z represents hydrogen, and
the other Z represents a member selected from the group consisting of hydrogen and the sulphonic acid group.

3. A tetrakisazo dyestuff having the formula:

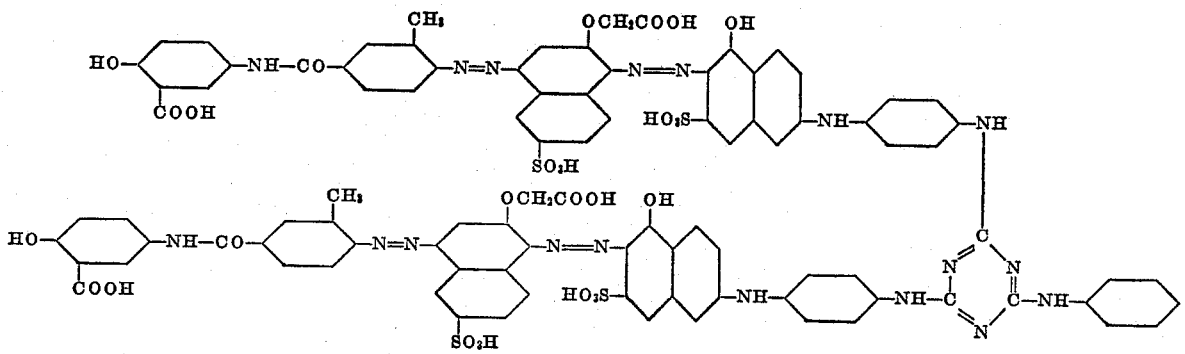

4. A tetrakisazo dyestuff having the formula:

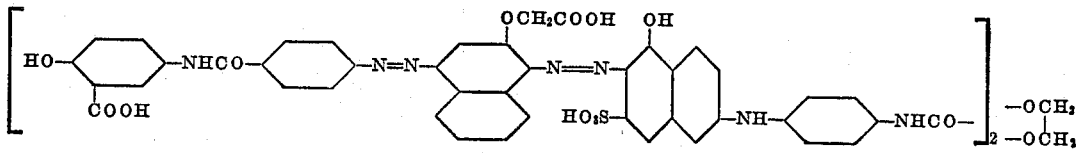

5. A tetrakisazo dyestuff having the formula:

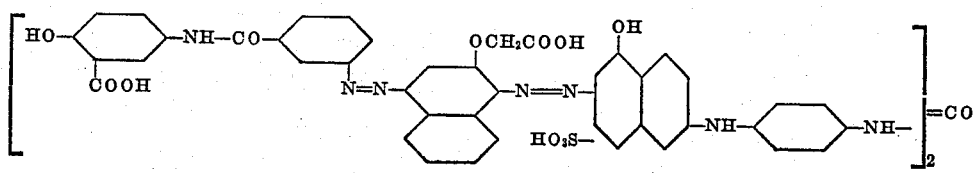

6. A tetrakisazo dyestuff having the formula:

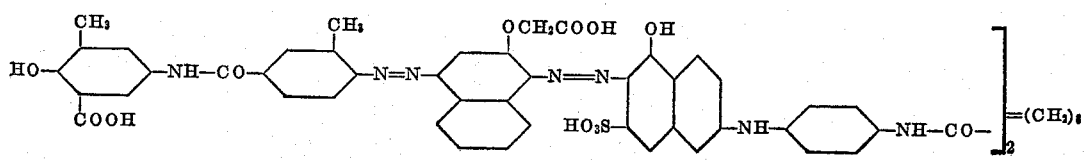

7. A tetrakisazo dyestuff having the formula:
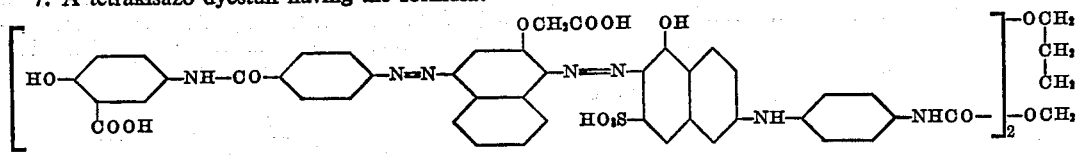
References Cited in the file of this patent
UNITED STATES PATENTS
| | | |
|---|---|---|
| 2,125,625 | Delfs et al. | Aug. 2, 1938 |
| 2,268,919 | Anderau | Jan. 6, 1942 |
| 2,391,164 | Kaiser | Dec. 18, 1945 |
| 2,458,776 | Grandjean | Jan. 11, 1949 |